T. KINKADE.
ANIMAL TRAP.
APPLICATION FILED DEC. 21, 1910.
990,817.
Patented Apr. 25, 1911.
2 SHEETS—SHEET 1.
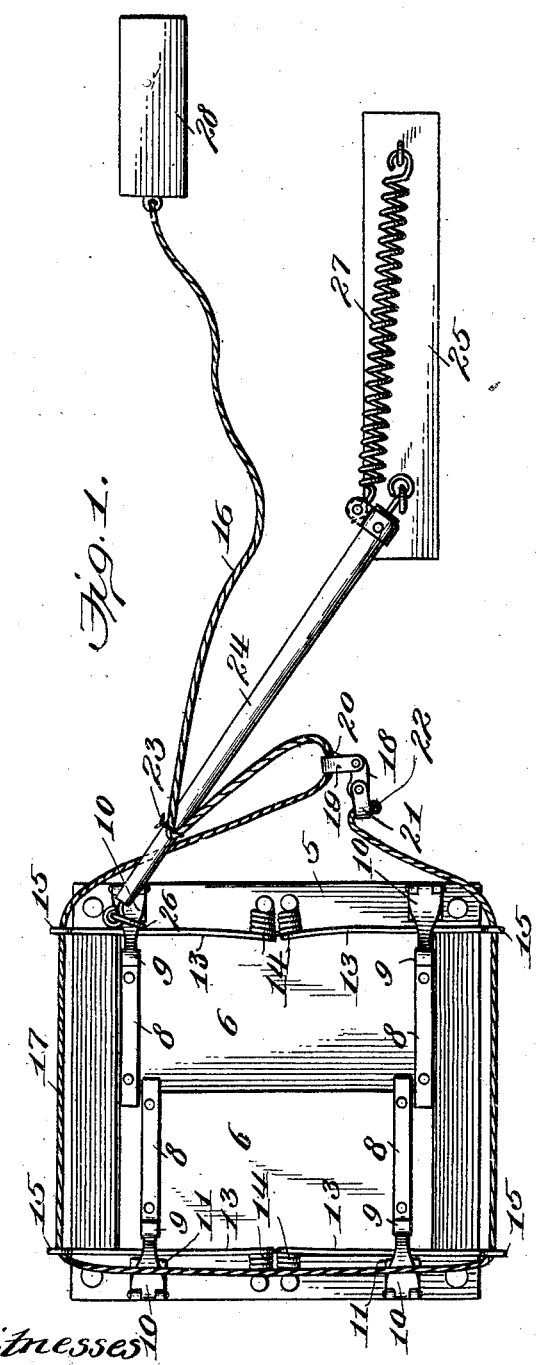
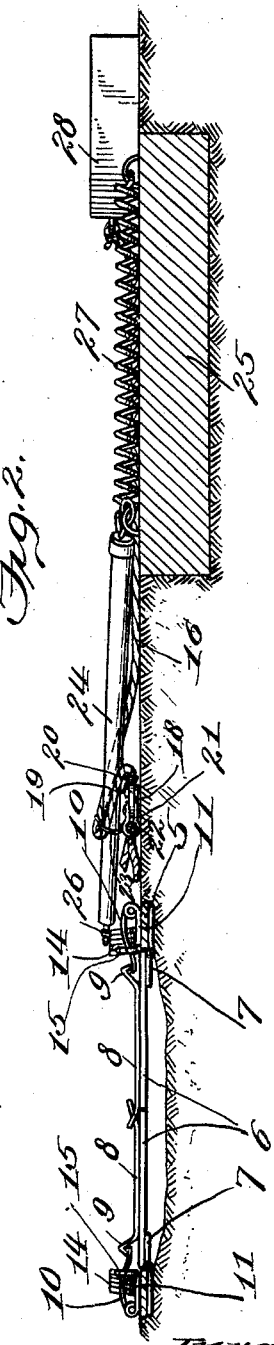
Witnesses
C. S. Kesler
A. R. Walton
Inventor
Thomas Kinkade
by
Atty's

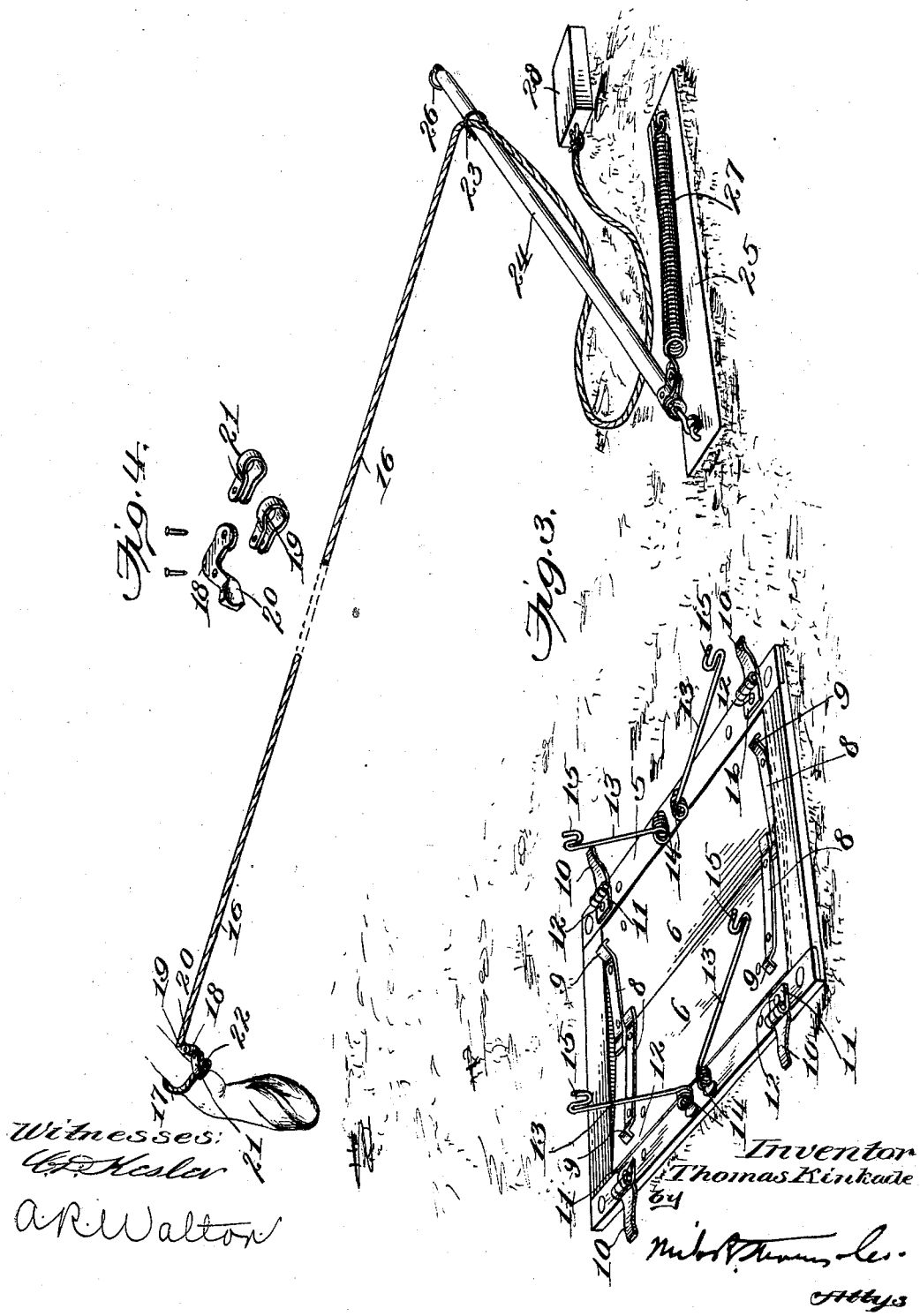

UNITED STATES PATENT OFFICE.

THOMAS KINKADE, OF ETNA, UTAH.

ANIMAL-TRAP.

990,817.  Specification of Letters Patent.  Patented Apr. 25, 1911.

Application filed December 21, 1910. Serial No. 598,559.

*To all whom it may concern:*

Be it known that I, THOMAS KINKADE, citizen of the United States, residing at Etna, in the county of Boxelder and State of Utah, have invented certain new and useful Improvements in Animal-Traps, of which the following is a specification.

The trap which is the subject of the present invention is designed more particularly for catching wild horses and other animals, and it consists of a lasso which is automatically thrown over the animal's leg, and drawn tight thereon.

The object of the present invention is to provide a trap of the kind stated which is simple in structure and reliable in operation, and to this end it consists in a novel construction and arrangement of parts to be hereinafter described and claimed.

In order that the invention may be better understood, reference is had to the accompanying drawings, forming a part of this specification, in which drawings—

Figure 1 is a top plan view of the trap in set position. Fig. 2 is a sectional view on the line 2—2 of Fig. 1. Fig. 3 is a perspective view showing the trap sprung. Fig. 4 is a detail in perspective showing the parts constituting the hondo of the lasso.

Referring specifically to the drawings, 5 denotes a rectangular frame within which is hinged a pair of trap doors 6, the hinges 7 of which are located on the under side of the frame and doors, and are so arranged that the latter may swing downwardly. To the top of the doors are fastened cross strips 8 which project from the meeting ends of the doors, the projecting ends of the strips of each door overlapping the other door and serving as stops to limit the downward swing of the doors. The projecting ends of the strips are bent upwardly, and these bends determine the extent of the downward swing of the doors. The other ends of the cross strips are formed into hooks 9 which serve as detents for triggers 10, which latter are hinged to plates 11 pivoted at 12 to opposite sides of the frame 5, two of said triggers being located on each of said sides of the frame. The plates 11 are pivoted in order that the triggers may be swung sidewise under the detents 9. The triggers, in conjunction with the detents, are designed for holding the trap set.

Between each pair of triggers is located a pair of vertically swinging spring arms 13, each of these arms being formed of stout wire which is formed at one end into a coil 14, and fastened at said end to the frame 5. The free end of the arm is formed into a hook 15. The arms extend in opposite directions and are adapted to be bent down and held in this position by the respective triggers 10 upon engaging the latter with the detents 9.

At 16 is indicated a rope which is arranged with a running noose 17 so as to form a lasso. The noose is adapted to be held in spread position by being supported on the hooks of the spring arms 13. The hondo of the lasso comprises an angular plate 18 at the bend of which is pivotally connected a loop 19 through which the running end of the rope passes. This loop is located so as to extend over one of the branches of the plate 18, and the extremity of said branch is formed with a cam 20 which is adapted to grip the running end of the rope passing through the loop 19. To the other arm of the plate 18 is secured a loop 21 to which one end of the rope is made fast by a knot or other suitable means 22. The cam 20 is arranged to prevent the noose from becoming loose when drawn around the animal's leg, said cam, however, permitting the noose to be drawn tight.

The running end of the rope 16 is connected by means of a light string 23 to a horizontally swinging arm 24, said arm being pivoted at one of its ends to a suitable base 25. The free end of the arm carries a link 26 which is for a purpose to be presently described. One end of a coil spring 27 is connected to the arm, adjacent to the hinged end thereof, the other end of the spring being fastened to the base 25. The running end of the rope also carries a block 28 the purpose of which will be presently made clear.

The trap will be located directly on the trail of the animal to be caught, it being hidden and anchored in stationary position by any suitable means. The base 25 will also be suitably anchored. The noose 17 is placed on the hooks 15, and the arms 13 are swung downwardly, and held in this position by slipping the triggers 10 over the same, the triggers being locked by engaging the same with the detents 9. The base 25 is located a sufficient distance from the frame 5 so that the arm 24 may be swung toward said frame, the link 26 being slipped over one of the triggers 10. The trap is now set, and the noose 17 lies close to the ground. When an animal steps on the trap doors 6, the latter swing downwardly, whereupon the detents 9 are disengaged from the triggers 10. The spring arms 13 are then released and they swing upwardly toward each other, and thus elevate the noose, and place it around one of the legs of the animal. At the same time the arm 24 is released, and it is swung away from the trap by the spring 27, thus pulling the noose tightly around the animal's leg, it being held in this position by the cam 20 as already described. As the animal leaves the trap with the rope drawn tight around the leg, the rope is disconnected from the arm 24 by the breaking of the string 23, and the animal is now free from the trap, but is fettered by the block 28 attached to the rope, and can therefore be readily caught.

I claim:

1. An animal trap comprising a support, trap doors mounted thereon, stops at the meeting ends of the doors for limiting the downward swing thereof, detents carried by the doors, triggers engageable by the detents, vertically swinging arms mounted on the support, and engageable by the triggers, a lasso having its noose supported by the aforesaid arms, and means for tightening the noose when the arms are released.

2. An animal trap comprising a support, a lasso mounted thereon, means for throwing the noose of the lasso, means for tightening the noose when the same is thrown, a separable connection between said tightening means and the lasso, and a fetter connected to the lasso.

3. An animal trap comprising a support, vertically swinging arms mounted thereon, a lasso having its noose supported by the aforesaid arms, a horizontally swinging arm connected to the lasso, holding means for all of said arms, and means for releasing the holding means.

In testimony whereof I affix my signature in presence of two witnesses.

THOMAS KINKADE.

Witnesses:
HENRY STURM, Jr.,
EVA STURM.

Copies of this patent may be obtained for five cents each, by addressing the "Commissioner of Patents, Washington, D. C."